US008462825B2

(12) United States Patent
Verhoef (10) Patent No.: US 8,462,825 B2
(45) Date of Patent: Jun. 11, 2013

(54) METHOD AND DEVICE FOR CARRIER ENVELOPE PHASE STABILISATION

(75) Inventor: Aart-Jan Verhoef, Vienna (AT)

(73) Assignee: Max-Planck-Gesellschaft zur Forderung der Wissenschaften e.V. (DE)

( * ) Notice: Subject to any disclaimer, the term of this patent is extended or adjusted under 35 U.S.C. 154(b) by 670 days.

(21) Appl. No.: 12/516,822

(22) PCT Filed: Dec. 1, 2006

(86) PCT No.: PCT/EP2006/011561
§ 371 (c)(1),
(2), (4) Date: Jun. 23, 2009

(87) PCT Pub. No.: WO2008/064710
PCT Pub. Date: Jun. 5, 2008

(65) Prior Publication Data
US 2010/0040097 A1   Feb. 18, 2010

(51) Int. Cl.
*H01S 3/13* (2006.01)
(52) U.S. Cl.
USPC ............... 372/29.023; 372/25; 372/29.02
(58) Field of Classification Search
USPC .................. 372/25, 29.02, 29.023
See application file for complete search history.

(56) References Cited

U.S. PATENT DOCUMENTS

| 4,022,531 | A* | 5/1977 | Orazio et al. | 356/332 |
|---|---|---|---|---|
| 2003/0156605 | A1* | 8/2003 | Richardson et al. | 372/25 |
| 2004/0017833 | A1* | 1/2004 | Cundiff et al. | 372/18 |

FOREIGN PATENT DOCUMENTS
WO   WO 2006008135 A2 * 1/2006

OTHER PUBLICATIONS

Chengquan Li, et al., "Carrier-Envelope Phase Shift Caused by Variation of Grating Separation," Optics Letters Opt. Soc. America USA, vol. 31, No. 21, Nov. 1, 2006, pp. 3113-3115, XP002445333 ISSN: 0146-9592.
Apolonski A., et al., "Controlling the Phase Evolution of Few-Cycle Light Pulses," Physical Review Letters, New York, NY, US, vol. 85, No. 4, Jul. 24, 2000. pp. 740-743, XP002198109 ISSN: 0031-9007.
Fortier T. M., et al., "Highly Phase Stable Mode-Locked Lasers," IEEE Journal of Selected Topics in Quantum Electronics IEEE USA, vol. 9, No. 4, Jul. 2003, pp. 1002-1010, XP002445334 ISSN: 1077-260X.
Baltuska A., et al., "Phase-Controlled Amplification of Few-Cycle Laser Pulses," IEEE Journal of Selected Topics in Quantum Electronics IEEE USA, vol. 9, No. 4, Jul. 2003, pp. 972-989, XP002445335 ISSN: 1077-260X.

(Continued)

*Primary Examiner* — Yuanda Zhang
(74) *Attorney, Agent, or Firm* — DLA Piper LLP (US)

(57) ABSTRACT

A method of stabilizing a carrier envelope phase of laser pulses generated with a laser device, comprising the steps of generating laser pulses with a seed laser unit, amplifying the laser pulses with an amplifier unit, generating an amplifier output signal derived from the laser pulses amplified with the amplifier unit, and controlling the carrier envelope phase of the laser pulses with an amplifier loop based on the amplifier output signal, wherein the controlling step comprises a step of adjusting an optical path of the amplifier unit in dependence on the amplifier output signal, wherein the adjusting step comprises introducing a dispersive material into the optical path of the amplifier unit. Furthermore, a stabilizing device for stabilizing a carrier envelope phase of laser pulses and a laser device including at least one stabilizing device are described.

17 Claims, 4 Drawing Sheets

OTHER PUBLICATIONS

Chengquan Li, et al., "Precision Control of Carrier-Envelope Phase in Grating Based Chirped Pulse Amplifiers," Optics Express Opt. Soc. America USA, vol. 14, No. 23, Nov. 2006, XP002445336 ISSN: 1094-4087.

Schatzel M. G., et al., "Long-Term Stabilization of the Carrier-Envelope Phase of Few-Cycle Laser Pulses," Applied Physics B (Lasers and Optics) Springer-Verlag Germany, vol. B79, No. 8, Dec. 2004, pp. 1021-1025, XP002445337 ISSN: 0946-2171.

Paulus G. G., et al., "Absolute-Phase Phenomena in Photoionization with Few-Cycle Laser Pulses," Nature, vol. 414, Nov. 2001, pp. 182-184.

Baltuska A., et al., "Attosecond Control of Electronic Processes by Intense Light Fields," Nature, vol. 421, Feb. 2003, pp. 611-615.

Paulus G. G., et al., "Measurement of the Phase of Few-Cycle Laser Pulses," Physical Review Letters, vol. 91, No. 25, Dec. 2003, pp. 253004-1-253004-4.

Kienberger R., et al., "Atomic Transient Recorder," Nature, vol. 427, Feb. 2004, pp. 817-821.

Goulielmakis E., et al., "Direct Measurement of Light Waves," Science, vol. 305, Aug. 2004, pp. 1267-1269.

Udem Th., et al., "Accurate Measurement of Large Optical Frequency Differences with a Mode-Locked Laser," Optics Letters, vol. 24, No. 13, Jul. 1999, pp. 881-883.

Sartania S., et al., "Generation of 0.1-TW 5-fs optical pulses at a 1-kHz Repetition Rate," Optics Letters. vol. 22, 1997. pp. 1562-1564.

Chang, Z., "Carrier-Envelope Phase Shift Caused by Grating-Based Stretchers and Compressors," *Applied Optics*, Nov. 10, 2006, vol. 45, No. 32, pp. 8350-8353.

\* cited by examiner

METHOD AND DEVICE FOR CARRIER ENVELOPE PHASE STABILISATION

RELATED APPLICATION

This is a §371 of International Application No. PCT/EP2006/011561, with an international filing date of Dec. 1, 2006 (WO 2008/064710 A1, published Jun. 5, 2008).

TECHNICAL FIELD

The present disclosure relates to a method of stabilising a carrier envelope phase (CE-phase) of laser pulses, in particular for carrier envelope phase stabilisation in femtosecond laser amplifier systems. Furthermore, the present disclosure relates to devices of stabilising a CE-phase of laser pulses, in particular for implementing the stabilising method.

BACKGROUND

Recent advances in the research on the interaction of ultrashort laser pulses with matter have shown that the outcome of many processes depends on the relative phase between the pulse envelope and the carrier wave, also called carrier envelope phase (CE-phase), see G. G. Paulus et al. in "Nature", vol. 414, 2001, p. 182; A. Baltuska et al. in "Nature" vol. 421, 2003, p. 611; and A. Baltuska et al. in "IEEE J. QE" vol. 9, 2003, p. 972. Control over the CE-phase of few-cycle pulses allowed studying processes on timescales shorter than the optical cycle, opening the door to attosecond metrology (1 as $=10^{-18}$ s) and creating a new research field in physics dubbed 'attoscience', see R. Kienberger et al. in "Nature" vol. 427, 2004, p. 817; and E. Goulielmakis et al. in "Science" vol. 305, 2004, p. 1267. These Experiments need control over the CE phase over long periods of time.

Figure 8:
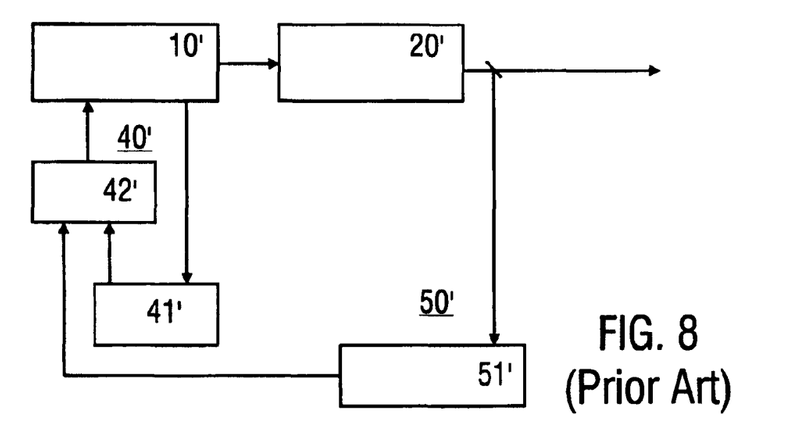
FIGS. 8 and 9: conventional optical setups adapted for stabilising the CE-phase (prior art).

Two basic approaches have been described for stabilising the CE-phase. A. Baltuska et al. ("Nature" vol. 421, 2003, p. 611) have proposed a stabilisation setup, which is illustrated in FIG. 8. With this setup, the CE-phase of a chirped-pulse amplifier 20' is stabilised using two control loops. In a first loop 40' including an f-to-2f interferometer 41' and locking electronics 42', a seed oscillator 10' is stabilised. In the second loop 50' including another f-to-2f interferometer 51', an offset is applied to the oscillator locking electronics 42' in order to stabilise the CE phase at the output of the amplifier 20'. The phase stabilisation of the oscillator 10' is forced to change the carrier envelope phase of the pulses seeded into the amplifier. This is achieved by changing the offset signal-value in the locking electronics 42', which in fact causes a controlled phase slipping of the oscillator pulses. The phase drift of the oscillator 10' is stabilised to be exactly $\pi/2$ between two pulses, ensuring that every fourth pulse coming from the oscillator to have the same phase. This is done by locking the beat signal to a quarter of the oscillator repetition rate. A frequency can be locked to another frequency with a fast 'up-down' counter, by letting the counter increment with every period of the reference frequency, and decrement with every period of the frequency to be stabilised. When the output value of the counter is filtered with a low-pass filter, an error signal is generated by comparing this value with a reference value. By changing the reference value, a controlled phase shift, proportional to the change of the reference value is introduced.

The stabilisation setup of A. Baltuska et al. has a first disadvantage as it exploits an additional degree of freedom of the oscillator phase locking electronics, potentially decreasing the quality of the lock. This decrease in quality of the lock can in fact be observed, and eventually causes the lock to break earlier than in the undisturbed case. A further disadvantage is related to the fact that the locking electronics 42' is adapted to be operated with the signal from a single amplifier only. Efficient stabilising amplifier chains is excluded with the technique of A. Baltuska et al.

Figure 9:
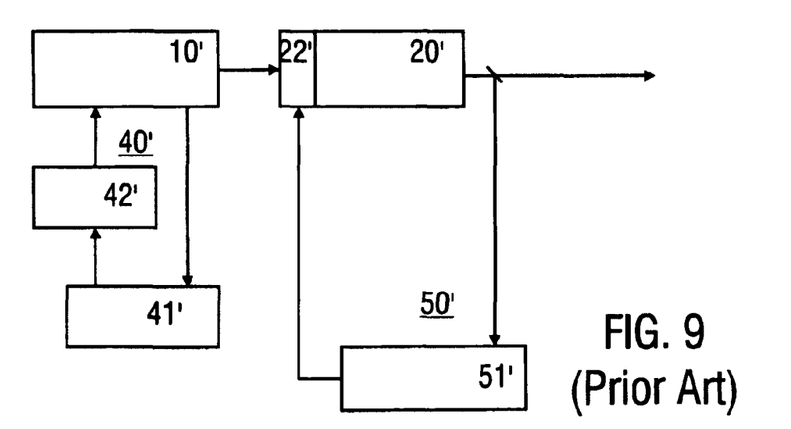

C. Li et al. have proposed another stabilisation setup ("Optics letters" vol. 31, 2006, p. 3113), which is illustrated in FIG. 9. Again, two control loops are used for stabilising the CE-phase of a chirped-pulse amplifier 20', namely a first loop 40' with the f-to-2f interferometer 41' and locking electronics 42' for stabilising the seed oscillator 10' and a second loop 50' with another f-to-2f interferometer 51'. Contrary to the technique of A. Baltuska et al., the second loop 50' directly controls the amplifier 20'. The CE phase is stabilised by changing a distance of telescope gratings in a pulse stretcher 22' of the amplifier 20'. As a first disadvantage, the technique of C. Li et al. is restricted to particular laser systems having a single amplifier only, which is operated with a grating based pulse stretcher. Grating based pulse stretcher represent complex optical systems, wherein each displacement of a grating causes additional undesired effects. Furthermore, the technique of C. Li et al. has an essential disadvantage in terms of the high sensitivity of stabilisation. Grating translation of about 1 μm yields a CE phase shift of more than 180°. Therefore, the practical control range of grating translation is restricted to about 2 μm or even smaller values, so that high precision drives are necessary for reliably stabilising the CE-phase.

An additional method has been demonstrated (M. Schätzel et al. in "Appl. Phys. B", vol. 79, 2004, p. 1021) allowing to control the phase of few-cycle pulses. However, this method can not be applied to longer pulses, like those coming directly from amplifier systems, and it needs phase-stable input pulses to begin with.

It could therefore be helpful to provide an improved method of stabilising a carrier envelop phase of laser pulses, which method is capable to avoid the disadvantages of the conventional stabilising techniques. Furthermore, it could be helpful to provide an improved stabilising device for stabilising the carrier envelop phase of laser pulses avoiding the disadvantages of the conventional optical setups.

SUMMARY

According to a first general aspect a CE-phase stabilising method is disclosed, wherein laser pulses generated with a seed laser unit and amplified with at least one amplifier unit are stabilised by an adjustment of the optical path of the laser pulses in the at least one amplifier unit, which adjustment includes an introduction of a dispersive material into the optical path. The amount of dispersive material, i.e. the length of the optical path through the dispersive material is adjusted by positioning the dispersive material in the optical path in dependence on an amplifier output signal. The inventor has found that the sensitive grating adjustment proposed by C. Li et al. can be replaced by the introduction of the dispersive material, which yields substantive advantages in terms of improved stability and robustness of CE-phase control. Another advantage is given by the fact that available laser devices can be simply upgraded with the amplifier loop and the dispersive material. By slightly changing the dispersion, in particular in the pulse stretcher or compressor, the CE-phase of the ultrashort amplified pulses can be controlled, without significantly changing the output pulse duration.

The term "dispersive material" used in the present specification refers to any transparent material being free of absorptions in the wavelength range of interest, in particular in the wavelength range from infrared via visible to ultraviolet light. Generally, the dispersive material can have a shape, which is selected in dependence on the particular requirements of application.

According to a second general aspect a stabilising device is disclosed being arranged for stabilising the CE-phase of laser pulses, wherein the stabilising device in particular includes a dispersion setting device being arranged for introducing a dispersive material into the optical path of an amplifier unit for amplifying laser pulses.

According to a third general aspect, a laser device is disclosed, which comprises a seed laser unit, like in particular a laser oscillator, being arranged for generating laser pulses, and the stabilising device according to the above second aspect. The laser device has the particular advantage of generating laser pulses with stabilised CE-phase, which allows new applications of the laser device, in particular in the field of femtosecond physics or in the field of optical data transmission and processing.

Advantageously, there are no particular restrictions with regard to the position of the dispersive material introduced into the optical path of the amplifier unit. According to a first example, the dispersive material is introduced into the optical path of the pulse stretcher of the amplifier unit. In this case, advantages result from the fact that the laser pulse have a relatively low intensity as they have not yet passed a pulse amplifier of the amplifier unit. Accordingly, any undesired effects, e. g. by non-linear interactions of the pulses with the dispersive material are avoided. The laser beam is unexpanded and the dispersive material can be provided with small size.

According to a further example, the dispersive material is introduced into the optical path of a pulse compressor of the amplifier unit. In this case, advantages are obtained as the pulse compressor usually offers free space for arranging and adjusting the dispersive material. For avoiding non-linear interactions of the pulses with the dispersive material, the laser beam can be expanded at least before a position of introducing the dispersive material.

As a further example, the dispersive material can be introduced directly into the optical path of the pulse amplifier included in the amplifier unit.

Advantageously, an exemplary method allows stabilising different stages of chirped-pulse amplifier chains independently. The method can be upscaled to multi-stage chirped-pulse amplifier chains, in which the same principle can be applied independently to every individual stage. Accordingly, with a further example, the laser pulses are amplified with at least one further amplifier unit, wherein the CE phase of laser pulses output by the further amplifier unit is stabilised with a corresponding further amplifier loop controlling an introduction of dispersive material into the optical path of the at least one further amplifier unit.

The amplifier chain including a plurality of amplifier units, wherein an amplifier loop is provided with at least one of the amplifier units for controlling the CE-phase of the output pulses, represents an independent subject.

According to an exemplary embodiment, the dispersive material comprises at least one dispersive prism, which advantageously allows a precise and reliable introduction of dispersion into the optical path of the amplifier unit by a simple linear translation of the dispersive prism.

Accordingly, the dispersive material may be introduced into the optical path of the amplifier unit by a movement (in particular translation) of the dispersive material. In the case of a dispersive prism, a displacement range is preferably selected to be larger than 5 μm and smaller than 500 μm. Particularly preferred is a displacement range of 10 μm to 100 μm. The inventor has found that smaller displacements may cause difficulties for a precise and reproducible setting of the dispersive material in the optical path. Larger displacements may have disadvantages in terms of response time and available space.

The dispersive material may be introduced into the optical path of the amplifier unit with a piezoelectric translator. Piezoelectric translators have particular advantages as precise drives in particular in the above preferred displacement range.

According to a further exemplary embodiment, the step of generating the amplifier output signal comprises splitting a portion of pulses amplified with the amplifier unit into an f-to-2f-interferometer, generating a fringe pattern with the f-to-2f-interferometer, and subjecting the fringe pattern to a Fourier transformation.

According to an exemplary embodiment, the CE-phase is additionally controlled with a seed laser loop, which is arranged for stabilising the seed laser unit generating the laser pulses. With the seed laser loop, the CE-phase stabilisation by introducing dispersive material into the amplifier unit is made more effective.

BRIEF DESCRIPTION OF THE DRAWINGS

Further details and advantage will be described in the following with reference to the attached drawings, which show in.

DETAILED DESCRIPTION

Figure 1:
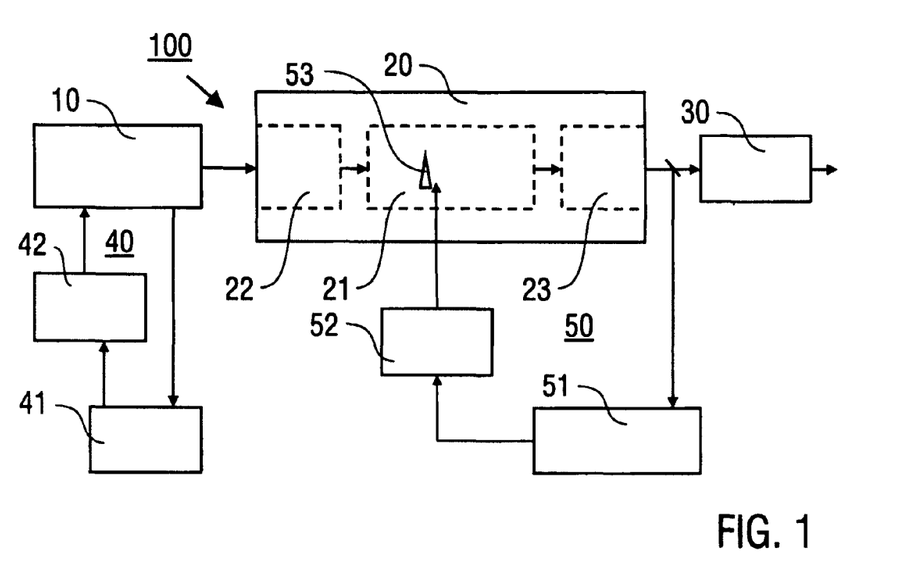
FIG. 1: a schematic illustration of a laser device equipped with a stabilising device.

Exemplary embodiments are described in the following with exemplary reference to a laser device 100 comprising a seed laser unit 10, an amplifier unit 20 and (optionally) a pulse shaping unit 30 (FIG. 1). The seed laser unit 10 is stabilised with a seed laser loop 40, while the amplifier unit 20 is stabilised with an independent amplifier loop 50 including an interferometer 51 and locking electronics 52. The amplifier unit 20 generally includes a pulse stretcher 22, a pulse amplifier 21 and a pulse compressor 23.

The components 10 to 50 and the feature comprising the controlled introduction of a dispersive material 53 into the optical path of the amplifier unit 20 are schematically illustrated in FIG. 1. It is emphasised that details of the laser device 100 can be implemented in practice with the optical setups illustrated in FIG. 3 or 6 or with other alternative optical setups providing the corresponding functions and effects of the laser device 100. Details of the optical components, the operation of the laser device and details of control loops are not described in the following as far as they are known from prior art.

First, the carrier envelope phase stabilisation of the seed oscillator 10 using the seed laser loop 40 is considered. In particular, the seed laser loop 40 includes a f-to-2f-interferometer 41 with a photonic crystal fibre and a Mach Zehnder set-up and locking electronic 42 which are structured and operated as described e. g. by A. Baltuska in "Nature", vol. 421, 2003, p. 611 or by T. Udem et al. in "Opt. Lett." vol. 24, 1999, p. 881. As an alternative, the seed laser loop can be implemented without the f-to-2f-interferometer, but rather with a combination of a non-linear crystal and a IR photodiode described with reference to FIG. 3 below.

Figure 2:
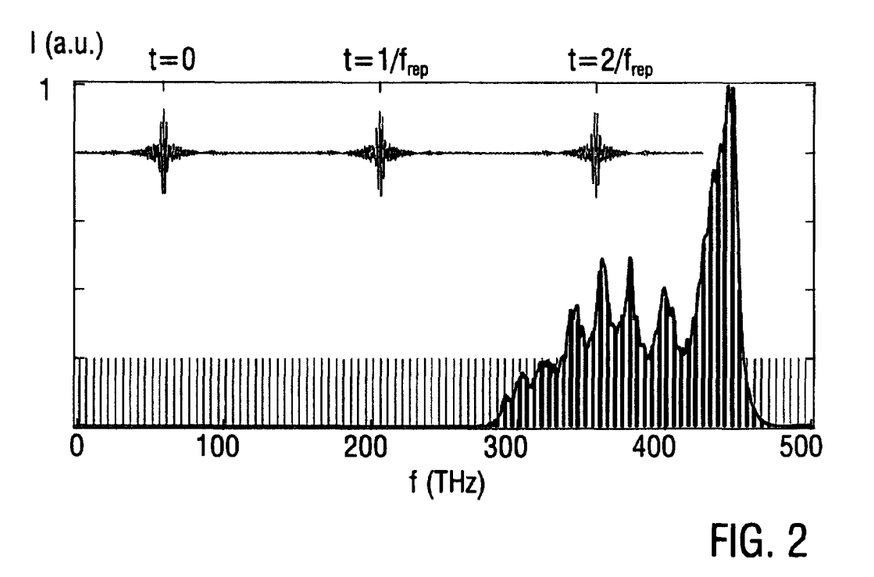
FIG. 2: a graphical representation of a laser pulse to be subjected to a stabilisation method.

The seed laser loop 40 is operated on the basis of the following considerations. In any resonator, only those modes can exist, which fulfill the simple condition that an integer number of oscillations fit in one roundtrip. So for a laser, only those wavelengths λ for which $n \lambda = l$ with l the cavity length, can exist in the resonator and therefore be emitted through the output coupler. In the frequency domain, all modes (with optical frequency ν) resonant in the laser are integer multiples of $f_{rep} = 1/T$ when T is the cavity roundtrip time, and hence $f_{rep}$ the repetition rate. In case of a ideally mode-locked laser, this would ensure that all pulses emitted from the laser would have the same carrier envelope phase, but this is not the case in real systems. The intracavity dispersion shifts the resonant modes such that they are no longer an integer multiple of the oscillator repetition rate $f_{rep}$, but they are offset by a certain amount $f_{offset}$, as is graphically shown in FIG. 2. FIG. 2 (thick lines) shows a frequency comb spectrum of a femtosecond oscillator. The inset shows the pulse train corresponding to the frequency comb, which shows a clear π/2 phase shift between each pulse. The thin lines show an extrapolation of the frequency comb, to make the comb offset from zero visible. This offset is directly linked to the phase-shift Δϕ between two subsequent pulses emitted from the oscillator, such that: $\Delta\phi = 2\pi f_{offset}/f_{rep}$. By stabilising the offset frequency, the pulse to pulse phase-shift of the seed oscillator can be stabilised with the first loop 40, and pulses with the same CE-phase can be selected for amplification as described e. g. by A. Baltuska in "Nature", vol. 421, 2003, p. 611.

Generally, the oscillator pulse-to-pulse phase shift is stabilised to be π/2, so pulses with the same CE phase are selected by dividing the oscillator repetition rate by an integer multiple of 4. Because the repetition rate of amplifier systems is so much lower than that of the seed oscillator, this imposes practically no limitations on the amplifier repetition rate. Although the carrier envelope phase of the pulses picked for amplification is the same, it is not the case after amplification. Measurements of the carrier envelope phase drift after amplification have shown, that the carrier envelope phase drifts over a few radians in several seconds, thus over several thousands of laser pulses.

This slow drift originates from different sources, the most prominent of which are energy fluctuations of the pump laser and the seed oscillator, and beam pointing fluctuations. As the drift of the CE-phase is relatively slow, it is possible to compensate for it by means of the amplifier loop 50. The phase drift is compensated with the method based on a phase shift introduced by the dispersive material 53 (or: dispersion) into the beam path. For example by changing the amount of glass in the beam path by a few micrometers, the carrier envelope phase can be changed significantly.

Figure 3:
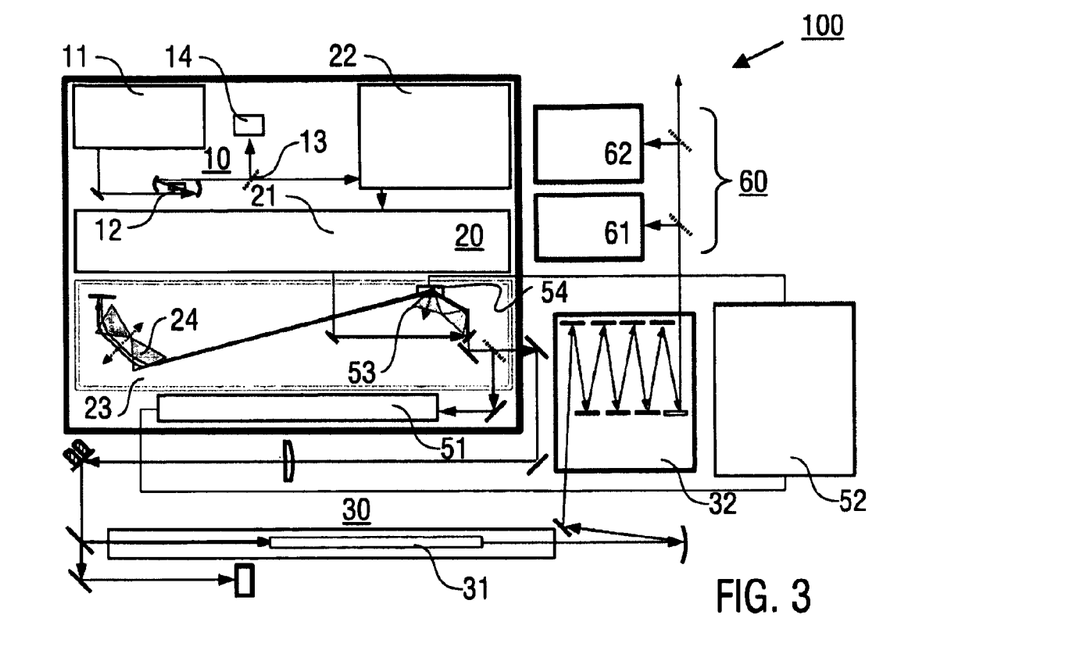
FIG. 3: a schematic illustration of an exemplary embodiment of the laser device.

According to FIG. 3, this approach is implemented by transversally shifting one of the prisms in the pulse compressor 23. The seed laser unit 10 comprises a Ti:sapphire oscillator 11, the output laser pulses of which are focussed into a non-linear crystal 12 and transmitted through a dichroic mirror 13 to the input of the pulse stretcher 22 of amplifier unit 20. The non-linear crystal 12 comprises a periodically poled MgO:LN crystal being arranged for difference frequency mixing. A portion of the laser pulses is split to an IR photodiode 14. The Ti:sapphire oscillator 11 is e. g. a "Femtosource Rainbow" (Femtolasers, Vienna, Austria).

The non-linear crystal 12 and the IR photodiode 14 are arranged for implementing the seed laser loop stabilising the seed laser unit 10 (see FIG. 1). With the non-linear crystal 12, frequency components of the laser pulse spanning an octave (f, 2f) are superposed. The output of the non-linear crystal 12 is measured with the IR photodiode 14 yielding a control signal for locking electronics (not shown in FIG. 3) stabilizing the oscillator 11 of unit 10.

The amplifier unit 20 comprises the pulse stretcher 22, the pulse amplifier 21 and the pulse compressor 23. The pulse stretcher 22 is arranged for stretching the laser pulses from about 5 fs to about 15 ps. To this end, the pulse stretcher 22 includes a material with positive dispersion, like e.g. a glass block made of the highly dispersive SF 57 glass and so-called TOD mirrors (with third- and fourth-order dispersion). As an example, the pulse stretcher is structured as described by S. Sartania et al. in "Optics Letters", vol. 2, 1997, p. 1563. The pulse amplifier 21 comprises a multipath resonator, e.g. a 9-pass chirped pulse amplifier with a repetition rate of 3 kHz.

After amplification, the laser pulses are subjected to pulse compression in the pulse compressor 23. The pulse compressor 23 is a prism compressor including compressor prisms 24, which are arranged for adjusting the pulse duration. The dispersive prism 53, which is one of the compressor prisms, is adapted for further adjusting the optical path in the pulse compressor 23 to control the CE-phase of the laser pulses. To this end, the dispersive prism 53 is arranged on a piezo-actuated translation stage 54. The translation stage 54 is arranged for displacing the prism with a distance on a micrometer scale. The insertion of the compressor prisms 24 in the prism pulse compressor 23 controls the pulse duration by varying the amount of material on the order of millimetres. Furthermore, the CE-phase is varied by displacing the dispersive prism 53 on the order of micrometers.

In the case of fused silica as a dispersive material 53 and pulses with a central wavelength of 800 nm, as is the case for the Ti:sapphire laser system used, addition of approximately 50 μm of material, introduces a CE-phase shift of 2π, without noticeably lengthening the pulse. Advantageously, no additional optical components need to be introduced, and strictly taken, not even a degree of freedom is added to the amplifier, since the material dispersion in the prism compressor 23 is also used for optimising the pulse duration. The translation stage 54 can be provided with another one of the compressor prisms. Transversally shifting one of the compressor prisms over a few micrometers will not affect the pulse duration, but it strongly modifies the CE-phase. In other words, the function of dispersion control can be fulfilled by one of the compressor prisms without an essential variation in pulse duration.

Figure 6:
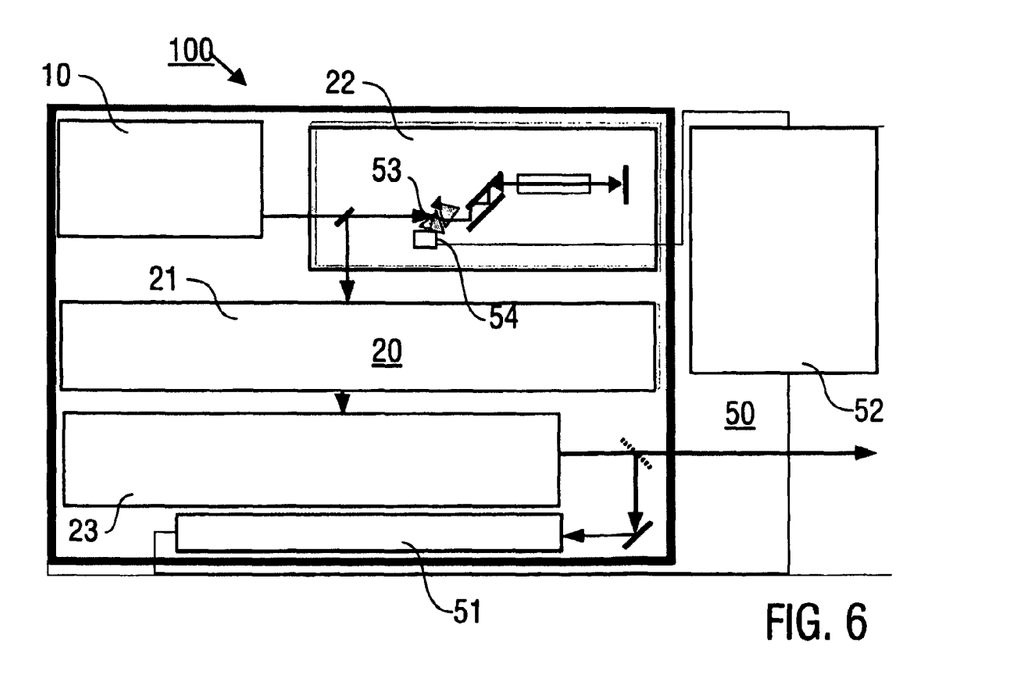
FIG. 6: a schematic illustration of another exemplary embodiment of the laser device.

Alternatively, the dispersive material can be introduced as an additional component into the optical path in the compressor 23. As an example, a pair of two prisms can be provided in an analogue way as shown in FIG. 6.

The CE-phase is stabilised with the amplifier loop 50. At the output 25 of the pulse compressor, a small portion (about 0.7%) of the compressed laser pulses is split into the amplifier loop 50, while the main portion of the compressed laser pulses is guided to the pulse shaping unit 30. The amplifier loop 50 comprises the f-to-2f interferometer 51 being arranged for generating an optical amplifier output signal and the locking electronic 52 for controlling the dispersion prism 53 in the pulse compressor 23. Locking electronic 52 includes a spectrum analyser, a processing unit and a DA output card. The processing unit includes a computer, which is arranged for reading the spectrum measured with the f-to-2f interferometer 51 and calculating a feedback signal from this. For operating the amplifier loop 50, the fringe-pattern measured at the output of the f-to-2f interferometer 51 is Fourier-transformed. The phase at the delay-point of the fringes corresponds to the CE-phase. The measured phase of the fringe-pattern represents an amplifier output signal, on the basis of which a proportional feedback signal is provided for setting the translation stage 54 with the dispersive material 53. The corresponding calculations are implemented as demonstrated by A. Baltuska et al. in "IEEE J. QE" vol. 9, 2003, p. 972. The feedback signal is applied with the translation stage under one of the prisms in the prism compressor, preferably to dispersive prism 53. Alternatively, the feedback signal can be applied to one of the remaining prisms, e. g. one or more of the compressor prisms 24.

The pulse shaping unit 30 receives the compressed pulses from the pulse compressor 23. The compressed pulses have e.g. an energy of 1 mJ and a duration of 25 fs. The laser pulses are guided through a neon filled hollow fibre 31 and a further chirped mirror pulse compressor 32, the output of which comprises laser pulses with e.g. 400 µJ energy and 5 fs pulse duration. Subsequently, the laser pulses are guided to a monitoring device 60 including e.g. an autocorrelator 61, which used for monitoring pulse duration after the hollow fibre 31. Optionally, an above-threshold ionisation detector device 62 can be provided, which is used for experimentally monitoring the phase stability of the pulses as described below. After passage through the monitoring unit 60, the laser pulses are output to the further application, like e.g. an experiment or an optical signal processor.

Figure 4:
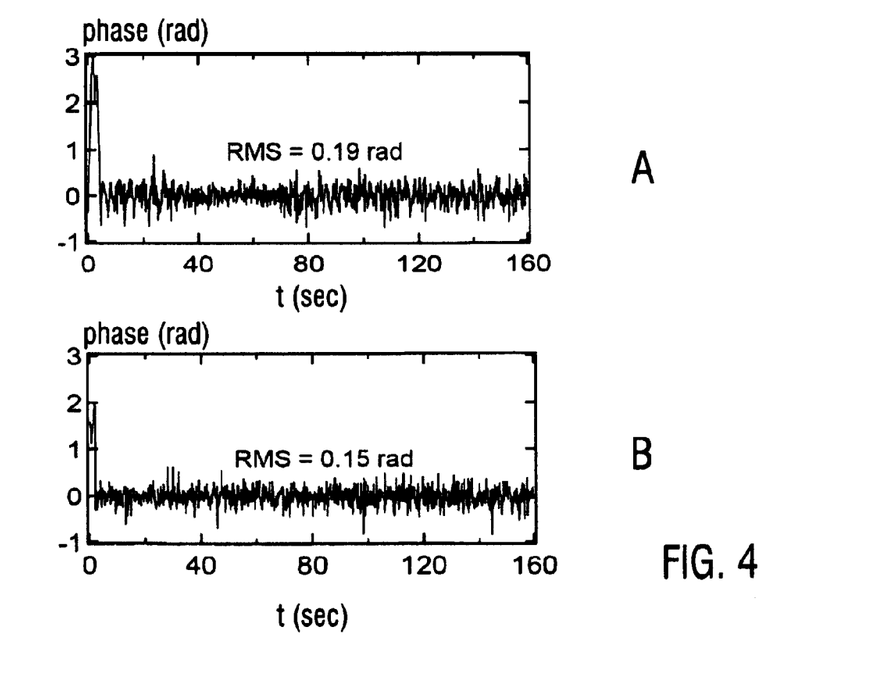
FIGS. 4 and 5: graphical representations of experimental results illustrating advantages obtained with the stabilisation method.

In FIGS. 4A and 4B, the compensation of the CE-phase drift with the conventional method (FIG. 8) and the method is shown, respectively. The two traces 4A and 4B were recorded both within a short period of time, ensuring that all other experimental conditions have not changed significantly. One can clearly see that the method results in a smaller RMS phase noise. The method features a smaller RMS phase noise, 0.15 rad versus 0.19 rad for the conventional method. The reason that the phase noise in the conventional case is larger originates from the fact that the feedback could not be made stronger without degrading the oscillator stability significantly.

As a further advantage, the inventor has found that the stabilisation can be reliably operated on a time scale of 30 hours or even more up to one week. This represents an essential development compared with conventional techniques which allowed a stabilisation within some hours only. In particular, experiments yielding only a few measurable events e. g. per minute can be conducted for measuring sufficient signals allowing an appropriate statistical analysis.

Figure 5:
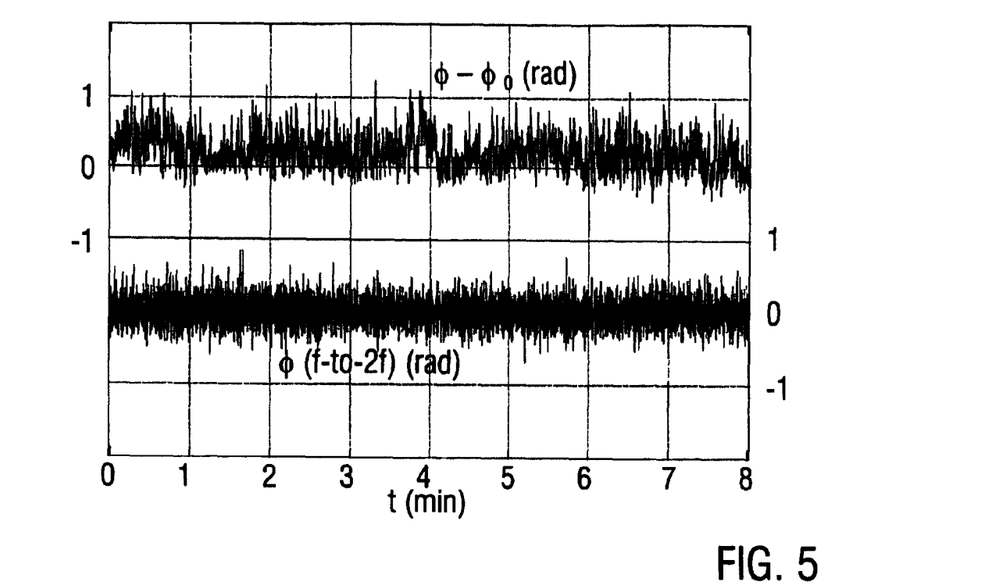

The result of an experiment proving that the method is functioning correctly is presented in FIG. 5. With the above-threshold ionisation detector device 62, an ionization measurement can be performed as described by G. G. Paulus et al. in "Phys. Rev. Lett." vol. 91, 2003, p. 253004 and M. Schätzel et al. in "Appl. Phys. B", vol. 79, 2004, p. 1021, to confirm the phase stability with the method. When the CE-phase of the amplifier is stabilised with a slow feedback from the f-to-2f interferometer 51 with the method, the phase measurement with the above-threshold ionisation detector device 62 can be used as an out-of-loop measurement to determine the quality of the phase-lock of the amplifier. In FIG. 5, the result of this measurement can be seen. The RMS phase noise measured in-loop with the f-to-2f interferometer 51 was 0.15 rad (lower curve), while the RMS phase noise measured out-of-loop with the above-threshold ionisation detector device 62 was 0.23 rad (upper curve), confirming that the method stabilises the CE-phase correctly.

FIG. 6 shows another exemplary embodiment with a schematically illustrated laser device 100 comprising the seed laser unit 10 and the amplifier unit 20 including the pulse stretcher 22, the pulse amplifier 21 and the pulse compressor 23. The amplifier unit 20 is stabilised with the amplifier loop 50 including the interferometer 51 and locking electronics 52. According to FIG. 6, the stabilisation approach is implemented by introducing a pair of Brewster-prisms 53 as dispersive material into the pulse stretcher 22 before amplification.

A small split-off from the output pulses of the pulse compressor 23 is fed into the f-to-2f interferometer 51. The CE-phase is stabilised with the locking electronics 52 as described above. The feedback is applied with a piezo-actuated translation stage 54 on which one of the Brewster prisms 53 in the pulse stretcher 23 is mounted. Translation of a few micrometers of the prism is enough to change the CE-phase significantly.

Figure 7:
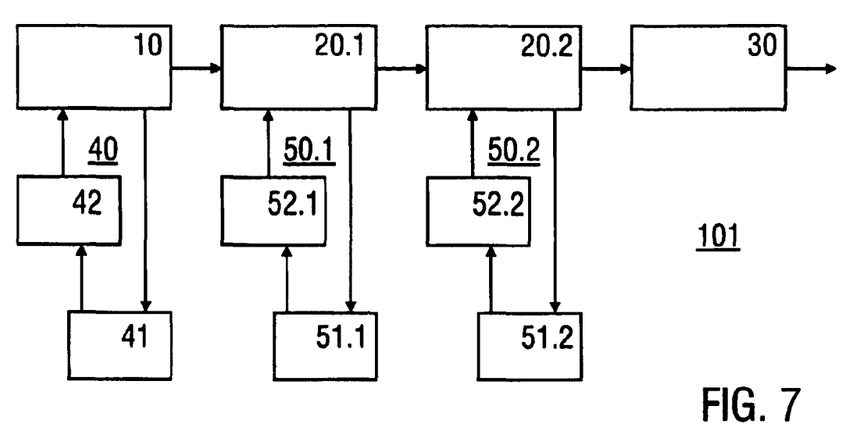
FIG. 7: a schematic illustration of a stabilised amplifier chain.

Another advantage of the method is, because it operates independent of any other feedback, that it can be applied multiple times in one system. For amplifier chains, this approach is therefore the only possible. In FIG. 7 this is drawn schematically for a multiple stage chirped-pulse amplifier system 101 comprising a seed laser unit 10 with a seed laser loop 40 and amplifier units 20.1, 20.2 each including a pulse stretcher, a pulse amplifier and a pulse compressor 23. Each amplifier unit 20.1, 20.2 is stabilised with an associated amplifier loop 50.1, 50.2, including an interferometer 51.1, 51.2 and locking electronics 52.1, 52.2. Each stabilisation is implemented according to the control technique described above.

The amplifier system 101 can include more than the two amplifier units 20.1, 20.2, e. g. up to 5 amplifier units. This approach allows to scale the control of the CE-phase to ultrashort pulses in the petawatt (1015 W) regime.

The features disclosed in the above description, the drawings and the claims can be of significance both individually as well as in combination for the realization of the aspects disclosed and its various forms.

The invention claimed is:

1. A method of stabilizing a carrier envelope phase of laser pulses generated with a laser device, comprising the steps of:
   generating laser pulses with a seed laser unit including a pulse laser,
   amplifying the laser pulses with an amplifier unit,
   generating an amplifier output signal derived from the laser pulses amplified with the amplifier unit, and
   controlling the carrier envelope phase of the laser pulses with an amplifier loop based on the amplifier output signal, wherein the controlling step comprises a step of adjusting an optical path of the amplifier unit in dependence on the amplifier output signal, wherein the adjusting step comprises:
   introducing a dispersive material into the optical path of the amplifier unit.

2. A method according to claim 1, wherein the adjusting step comprises:

introducing the dispersive material into the optical path of a pulse compressor or a pulse stretcher included in the amplifier unit.

3. A method according to claim 1, wherein the step of generating the amplifier output signal comprises:
- coupling a portion of the amplified pulses into an f-to-2f-interferometer,
- generating a fringe pattern with the f-to-2f-interferometer, and
- subjecting the fringe pattern to a Fourier transformation.

4. A method according to claim 1, comprising the further steps of:
- amplifying the laser pulses with at least one further amplifier unit,
- generating at least one further amplifier output signal derived from the laser pulses amplified with the at least one further amplifier unit, and
- controlling the carrier envelope phase of the laser pulses with at least one further amplifier loop, wherein the controlling step comprises introducing a further dispersive material into an optical path of the at least one further amplifier unit in dependence on the at least one further amplifier output signal.

5. A method according to claim 4, wherein the laser device comprises a chain of amplifier units and the carrier envelope phase of the laser pulses output by the chain of amplifier units is controlled by introducing dispersive material into the optical path of each of the amplifier units.

6. A method according to claim 1, wherein the step, of introducing the dispersive material comprises:
- setting a dispersive prism in the optical path of the amplifier unit.

7. A method according to claim 6, wherein a position of the dispersive prism is set by a translation of the dispersive prism in the range of 5 μm to 500 μm.

8. A method according to claim 1, comprising the steps of:
- generating a seed laser output signal derived from the laser pulses generated with the seed laser unit, and
- controlling the carrier envelope phase of the laser pulses with a seed laser loop based on the seed laser output signal.

9. A stabilizing device for stabilizing a carrier envelope phase of laser pulses, comprising:
- an amplifier unit arranged for amplifying laser pulses,
- an amplifier output signal generator arranged for generating an amplifier output signal derived from the laser pulses,
- an amplifier loop arranged for controlling the carrier envelope phase of the laser pulses based on the amplifier output signal, and
- a dispersion setting device arranged for introducing a dispersive material into an optical path of the amplifier unit in dependence on the amplifier output signal.

10. A stabilizing device according to claim 9, wherein the dispersion setting device is arranged in the optical path of a pulse compressor or a pulse stretcher.

11. A stabilizing device according to claim 9, wherein the amplifier loop comprises a f-to-2f-interferometer and a Fourier transformation unit coupled with the dispersion setting device.

12. A stabilizing device according to claim 9, further comprising:
- at least one further amplifier unit arranged for amplifying laser pulses,
- at least one further amplifier output signal generator arranged for generating at least one further amplifier output signal derived from the laser pulses,
- at least one further amplifier loop arranged for controlling the carrier envelope phase of the laser pulses based on the at least one further amplifier output signal, and
- at least one further dispersion setting device arranged for introducing a dispersive material into an optical path of the at least one further amplifier unit in dependence on the at least one further amplifier output signal.

13. A stabilizing device according to claim 9, wherein the dispersive material comprises a dispersive prism and the dispersion setting device is arranged for setting the dispersive prism in an optical path of the amplifier unit in dependence on the amplifier output signal.

14. A stabilizing device according to claim 13, wherein the dispersion setting device is arranged for setting the position of the dispersive prism in the range of 5 μm to 500 μm.

15. A stabilizing device according to claim 9, wherein the dispersion setting device comprises a piezoelectric translator.

16. A laser device, comprising:
- a seed laser unit arranged for generating laser pulses, and
- at least one stabilizing device according to claim 9, being arranged for stabilizing a carrier envelope phase of the laser pulses generated with the seed laser unit.

17. A laser device according to claim 16, further comprising:
- a seed laser output signal generator arranged for generating a seed laser output signal derived from the laser pulses, and
- a seed laser loop arranged for controlling the carrier envelope phase of the laser pulses based on the seed laser output signal.

* * * * *